United States Patent [19]

Cotter et al.

[11] 4,417,647
[45] Nov. 29, 1983

[54] DISC BRAKES AND FRICTION PAD ASSEMBLIES THEREFOR

[75] Inventors: Edmund Cotter, Birmingham; Francis Whatley, Uplands, both of England; Heinz W. Baum, Saarbrucken-Dudweiler, Fed. Rep. of Germany

[73] Assignee: Lucas Industries Limited, Birmingham, England

[21] Appl. No.: 239,123

[22] Filed: Feb. 27, 1981

[30] Foreign Application Priority Data

Mar. 1, 1980 [GB] United Kingdom ............... 8007044
Apr. 19, 1980 [GB] United Kingdom ............... 8012977

[51] Int. Cl.³ .......................................... F16D 65/40
[52] U.S. Cl. ............................................. 188/73.38
[58] Field of Search ............... 188/73.36, 73.37, 73.38, 188/73.39

[56] References Cited

U.S. PATENT DOCUMENTS

| | | | |
|---|---|---|---|
| 3,322,236 | 5/1967 | Burnett | 188/73.39 X |
| 3,712,422 | 1/1973 | Haraikawa et al. | 188/73.43 X |
| 3,841,444 | 10/1974 | Baum et al. | 188/73.38 X |
| 3,893,547 | 7/1975 | Schaaz | 188/73.38 |
| 3,899,051 | 8/1975 | Grosseau | 188/73.38 |
| 4,027,751 | 6/1977 | Gerard | 188/73.38 |
| 4,056,174 | 11/1977 | Wienand et al. | 188/73.36 |
| 4,225,017 | 9/1980 | Camp | 188/73.39 X |

FOREIGN PATENT DOCUMENTS

| | | | |
|---|---|---|---|
| 1927459 | 5/1970 | Fed. Rep. of Germany | 188/73.36 |
| 1967110 | 10/1977 | Fed. Rep. of Germany | 188/73.38 |
| 2232963 | 1/1975 | France | 188/73.36 |
| 2268989 | 11/1975 | France | 188/73.38 |
| 52-9770 | 1/1977 | Japan | 188/73.38 |

Primary Examiner—George E. A. Halvosa
Attorney, Agent, or Firm—Scrivener, Clarke, Scrivener and Johnson

[57] ABSTRACT

The present invention provides a friction pad assembly comprising a backing plate and a pad of friction material secured thereto, the backing plate having at least one hole offset from the central axis of the assembly, through which a pad support pin passes to engage a wire spring supported on the backing plate and having two generally oppositely directed arms. The arms engage either the pad support pins and/or part of the brake and produce an asymmetric loading of the pad assembly, the spring biasing the friction pad assembly against an abutment face of the brake to thus reduce the possibility of the pad assembly hitting the abutment face to produce disturbing 'klonking'.

14 Claims, 5 Drawing Figures

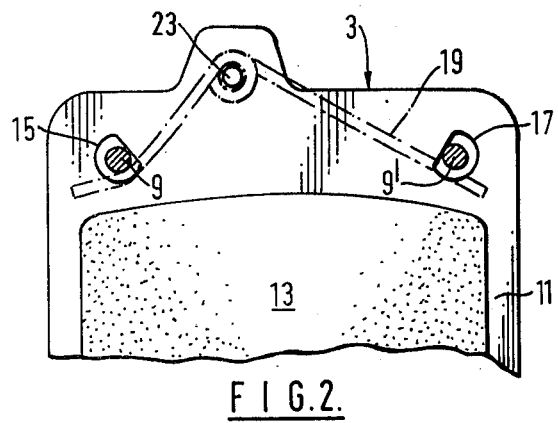
F I G.2.
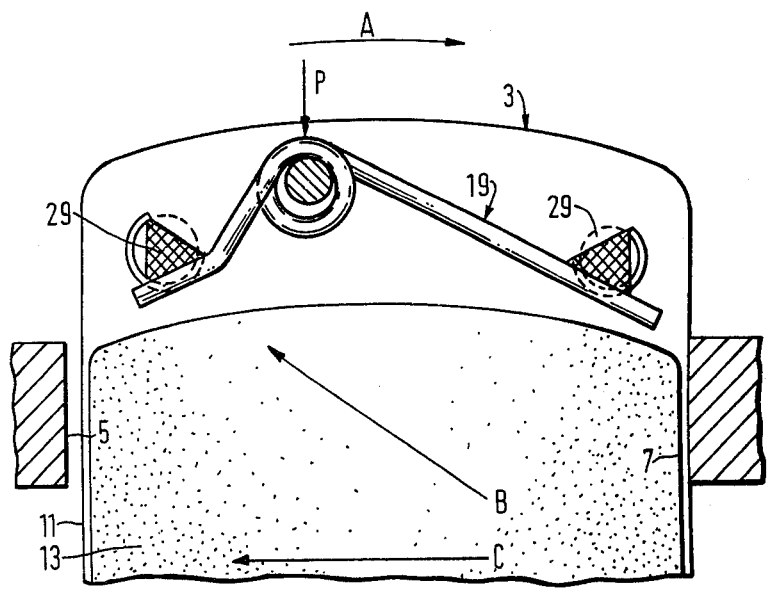
F I G.3.

DISC BRAKES AND FRICTION PAD ASSEMBLIES THEREFOR

DESCRIPTION

The present invention relates to a friction pad assembly and a disc brake incorporating such an assembly.

In particular the present invention relates to a friction pad assembly for a spot-type disc brake wherein the friction pad assemblies are guided for movement towards and away from the disc between surfaces formed either in the caliper or in the torque taking member. These surfaces form abutment surfaces for the friction pad assemblies when the friction pad assemblies are subjected to drag forces during braking. Under braking the friction pad assemblies are susceptible to rapid movement towards their respective abutment surfaces causing a "klonking" of the pad assemblies against their respective abutment surfaces. This "klonking" is clearly undesirable and possibly disturbing to a driver and/or passengers.

"Klonking" can be minimised by utilising closely controlled tolerances between the two abutment surfaces for each pad assembly. However, should the resulting clearances between pad assemblies and respective abutments to be too small then seizure might tend to occur more rapidly.

To reduce "klonking" it has been known to utilise a spring to circumferentially bias the friction pad assemblies into engagement with their respective abutment surfaces.

Pad rattle in the guides or on its support pins, is another undesirable feature which can be overcome by the use of a spring and our British Pat. No. 1,267,199 discloses a disc brake wherein a single spring reduces both klonking and pad rattle. A disadvantage of this particular arrangement is that the spring has a cruciform shape and is necessarily made from a generally flat sheet of spring steel, for example, and because of its shape is subject to wastage of material during manufacture, and also it is expensive to produce. A furher disadvantage is that the spring is required to be located in a slot formed in an edge of the backing plate so that manufacture is further complicated and costs increased.

The aim of the present invention is to provide a friction pad assembly which is comparatively cheap and easy to manufacture and can be so arranged in a brake that the undesirous "klonk" condition is eliminated when braking in the forward direction and substantially alleviated when braking in the reversed direction, and pad rattle is also reduced to a minimum.

According to the present invention there is provided a friction pad assembly for a disc brake, comprising a backing plate and a pad of friction material secured thereto, the backing plate having at least one hole offset from the central axis of the assembly, through which a pad support pin can pass to engage a wire spring supported on the backing plate and arranged to produce an assymmetric loading effect on the pad assembly when installed in a disc brake.

In a preferred embodiment of the present invention the backing plate is planar and has two holes provided in a region of the backing plate, which is free of friction material, the holes being symmetrically arranged on the pad assembly. Preferably the wire spring comprises a coiled region and two generally oppositely directed arms, the coiled region being mounted on a support on the backing plate, and being located on the opposite side of a line connecting the said holes, from the friction material. The support is preferably a rivet, and the rivet may be so designed to prevent removal of the spring. Preferably one arm of the spring is shorter than the other, and the spring support is closer to one of said holes i.e. nearer to one side edge of the backing plate, to thus provide the assymmetric loading effect when the spring arms, in use, engage pad support pins passing through said holes in the braking plate.

When installed in a disc brake, the preferred embodiment of friction pad assembly constructed according to the present invention, is supported on two pad supporting pins which may be of circular, triangular or any other polygonal cross-section. The pins pass through the backing plate holes with clearance and the arms of the spring engage under tension under the respective pins. The ends of the pins are secured in a conventional manner in the brake and thus cannot move. The spring thus biasses the friction pad assembly radially of the brake down onto the pins reducing pad rattle. Further, due to the spring support being offset from the centre of assembly and therefore closer to one pin than the other, the spring exerts a greater force on the closer pin, the force having a circumferential component (with respect to the disc) due to the angled position of the spring arm, which biasses the friction pad assembly in the circumferential direction against an abutment surface. The spring is arranged to bias the friction pad assembly against the forward abutment surface, it being the shorter trailing arm of the spring which provides the bias to prevent klonking in the forward direction of braking. This bias also alleviates klonking in the reverse direction of braking as circumferential movement of the friction pad assembly towards the reverse direction abutment surface, is resisted by the spring, the spring softening the impact.

Preferably the holes in the backing plate are D-shaped and are oriented so that the pins traverse the straight side of the holes, reverse direction braking causing the pad assembly to move generally diagonally with respect to the brake path as opposed to circumferentially. This diagonal movement coupled with the reaction forces of the spring arms provide a slower application of the pad assembly to the abutment surfaces than would normally be expected, and thus alleviates klonking in reverse direction braking.

In a further embodiment of the present invention the backing plate is planar and only one hole is provided in a region of the backing plate, which is free of friction material. Preferably the wire spring comprises a coiled region and two generally oppositely directed arms, the coiled regions being mounted on a support on the backing plate. The support is preferably a rivet, and the rivet may be so designed to prevent removal of the spring. Preferably one arm of the spring is shorter than the other, and the spring support is closer to one side edge of the backing plate than the other, whereby the assymmetric loading effect is produced.

When installed in a disc brake this further embodiment of friction pad assembly according to the present invention is supported on a pad supporting pin which may be of circular cross-section or any other desired polygonal cross-section e.g. triangular. The pin passes through the backing plate hole with clearance and the ends of the pin are secured in a conventional manner in the brake and thus cannot move. One arm of the spring engages the pad supporting pin and/or part of the brake i.e. caliper or torque plate, and the other arm engages solely part of the brake. The spring thus biasses the friction pad assembly effectively radially of the brake against the pin, thus reducing pad rattle. Further, due to the spring support being offset from the centre of the assembly the spring exerts a greater force on its point of contact closest to the point at which the spring is supported on the backing plate, the force having a circumferential component (with respect to the disc) due to the angled position of the spring arm, which biasses the friction pad assembly in the circumferential direction against an abutment surface. The spring is preferably arranged to bias the friction pad assembly against a forward abutment surface, it being the trailing arm of the spring which normally will be the shorter arm, which provides the bias to prevent klonking in the forward direction of braking. This bias also alleviates klonking in the reverse direction of braking as circumferential movement of the friction pad assembly towards the reverse direction abutment surface, is resisted by the spring, the spring softening the impact.

In a still further embodiment of the present invention the spring has one arm, one end of which is secured to the backing plate of the friction pad assembly and the other end, in use, acts on a pad supporting pin passing through a hole in the backing plate and/or part of the brake e.g. caliper member, to produce the assymetric loading effect on the friction pad assembly.

According to a further aspect of the present invention there is provided a friction pad assembly for a disc brake, comprising a backing plate and a pad of friction material secured thereto, the backing plate having two holes spaced apart from each other, through which pad support pins can pass to engage a wire spring supported on the backing plate and arranged to produce an assymmetric loading effect on the pad assembly.

According to a further feature of the present invention there is provided a disc brake comprising a caliper and a torque member, a friction pad assembly being supported on spaced apart pins carried by the caliper or torque member, the friction pad assembly comprising a backing plate with a pad of friction material secured thereto, the backing plate having two holes spaced apart from each other, through which the pad support pins can pass with clearance to engage a wire spring supported on the backing plate and arranged to produce an assymmetric loading effect on the pad assembly, the spring engaging said pins to bias the friction pad assembly against the pins and circumferentially against an abutment face provided on the caliper or torque member.

According to a still further feature of the present invention there is provided a disc brake comprising a caliper and a torque member, a friction pad assembly being supported on at least one pin carried by the caliper or torque member, the friction pad assembly comprising a backing plate with a pad of friction material secured thereto, the backing plate having at least one hole offset from the central axis of the assembly, through which the pad support pin passes to engage a wire spring supported on the backing plate and arranged to produce an assymmetric loading effect on the pad assembly, the spring engaging the pin and/or caliper or torque plate, to thus bias the friction pad assembly against the pin and circumferentially against an abutment face provided on the caliper or torque member.

The present invention will now be further described, by way of example, with reference to the accompanying drawings, in which:

FIG. 2 is a detailed view of part of the friction pad assembly of FIG. 1;

FIG. 3 illustrates the friction pad assembly of FIGS. 1 and 2 mounted on triangular cross-section pins;

Figure 1:
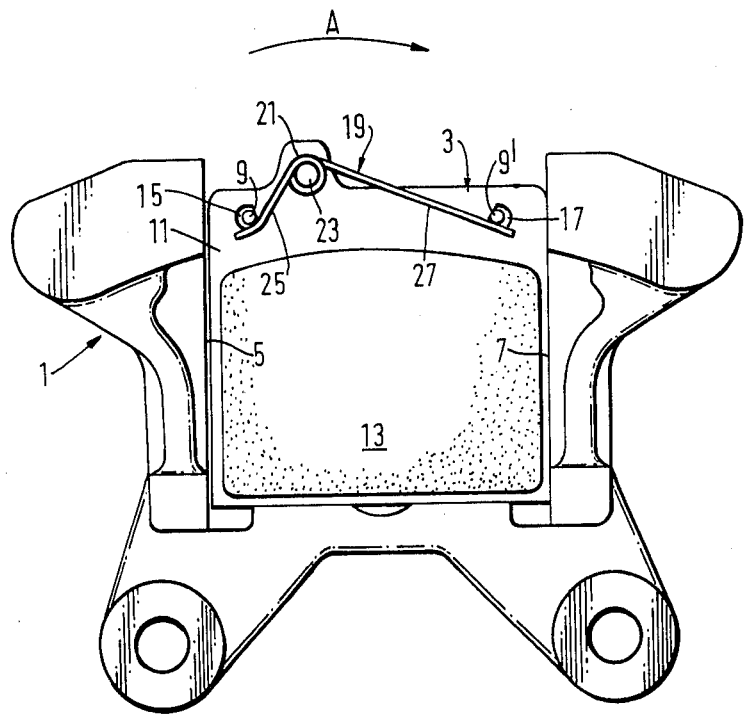
FIG. 1 shows a cutaway section of a disc brake incorporating a preferred embodiment of friction pad assembly constructed according to the present invention.

In FIG. 1, one half of a caliper 1 is shown, with a friction pad assembly 3 guided for operative sliding movement towards and away from a disc (not shown) between abutment surfaces 5 and 7, on support pins 9 and 9'. The forward direction of rotation for the brake is shown by arrow A.

The friction pad assembly 3 comprises a planar backing plate 11 to which a pad 13 of friction material is secured. The backing plate 11 has two symmetrically arranged, D-shaped apertures 15,17 (best seen in FIg. 2) through which pad support pins 9 and 9' respectively, extend, the pins being carried at each end by caliper 1. As an alternative to the D-shaped hole arrangement of FIG. 2, the D-shaped holes can be equally well oriented in like manner. A wire spring 19 is mounted on backing plate 11, the spring 19 having a coiled region 21 which engages over a support in the form of a rivet 23 secured to the backing plate, a short spring arm 25 and a longer spring arm 27 extending from the coiled region in generally opposite directions. The rivet can permanently secure the spring to the backing plate or the spring may be detachable, as desired. An alternative spring support can of course be used. The rivet 23 is however offset with respect to the axis of symmetry of the pad assembly and is positioned nearer to aperture 15 than 17, and above a line joining pins 9 and 9', as seen in FIGS. 1 and 2. Spring arms 25 and 27 are tensioned under pins 9 and 9' respectively thus tensioning the friction pad assembly against the supporting pins and reducing rattle. Due to the short spring arm 25 a larger amount of the spring force is applied to pin 9 and due to the angle of arm 25 relative to a line extending between the pins 9 and 9', the force has a circumferential component in direction 'A' which is greater than the opposing component force from the longer spring arm 27 so that the friction pad assembly is biassed in direction 'A' against pad abutment surface 7. Thus klonking is prevented during braking in the forward direction 'A'.

During braking in the reverse direction i.e. opposite to arrow 'A', the reaction forces of spring arms 25 and 27 resist movement of the pad assembly towards pad abutment surfaces 5 and thus reduce the impact and therefore the "klonking". The D-shaped design of apertures 15 and 17 at a predetermined orientation, further alleviates "klonking" in the reverse direction of braking by causing the pad assembly 3 to move, in effect, diagonally with respect to the circumferential path 'A' i.e. to move in direction 'B' (see FIG. 3) as opposed to direction 'C'. This diagonal path of movement together with the reaction forces of spring arms 25 and 27 provides a slower application of the pad assembly 3 to abutment surface 5, thus alleviating klonking if not preventing such undesirable noise.

Whilst the embodiment of FIGS. 1 and 2 utilises cylindrical pad support pins 9 and 9′, triangular cross section pins 29 as seen in FIG. 3, can be substituted, providing mating surfaces between the pins and the straight edge of the D-shaped holes.

Figure 4:
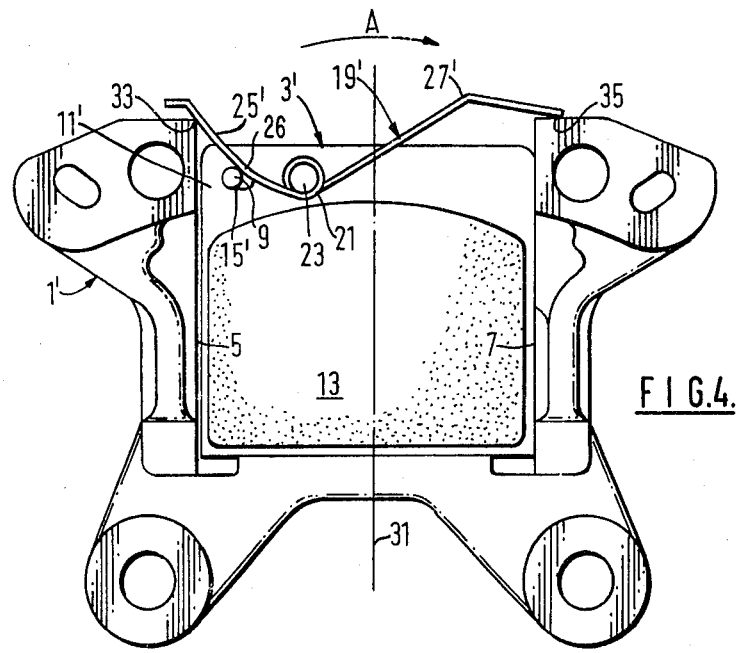
FIG. 4 shows a cutaway section of a disc brake incorporating another embodiment of a friction pad assembly constructed according to the present invention.

The same reference numerals have been used in FIGS. 3 and 4 for parts equivalent to those in FIg. 1.

In FIG. 4, one half of a caliper 1′ is shown, with a friction pad assembly 3′ guided for operative sliding movement towards and away from a disc (not shown) between abutment surfaces 5 and 7, on support pin 9. The forward direction of rotation for the brake is again shown by arrow A.

The friction pad assembly 3′ comprises a planar backing plate 11′ to which a pad 13 of friction material is secured. The backing plate 11′ has an elongated aperture 15′ through which pad support pin 9 extends, the pin being carried at each end by caliper 1′. A wire spring 19′ is mounted on the backing plate 11′, the spring 19′ having a coiled region 21 which engages over a support in the form of a rivet 23 secured to the backing plate, a short spring arm 25′ and a longer spring arm 27′ extending from the coiled region in generally opposite directions. The rivet can permanently secure the spring 19′ to the backing plate 11′ or the spring may be detachable, as desired. An alternative spring support can of course be used. The rivet 23 is however offset with respect to the central axis 31 of the pad assembly and is positioned near to aperture 15′. Spring arms 25′ and 27′ are located under tension against parts 33 and 35 respectively of caliper 1′ thus tending to lift the pad assembly as viewed in FIG. 1, and tensioning the pad assembly against pin 9 to thus reduce rattle. Spring arm 25′ is also designed with a kink 26 so that it also engages pad support pin 9. Due to the effective length of spring arm 25′ between 33 and coiled region 21, being shorter than the effective length of spring arm 27′ between 35 and coiled region 21, the force exerted by the spring on pin 9 has a circumferential component in direction 'A' so that the friction pad assembly is biassed in direction 'A' against pad abutment face 7. Thus klonking is prevented during braking in the forward direction 'A'.

During braking in the reverse direction i.e. opposite to arrow 'A', the reaction forces of spring arms 25′ and 27′ resist any possible movement of the pad assembly towards abutment surfaces 5 and thus reduce any impact and therefore the 'klonking'.

Figure 5:
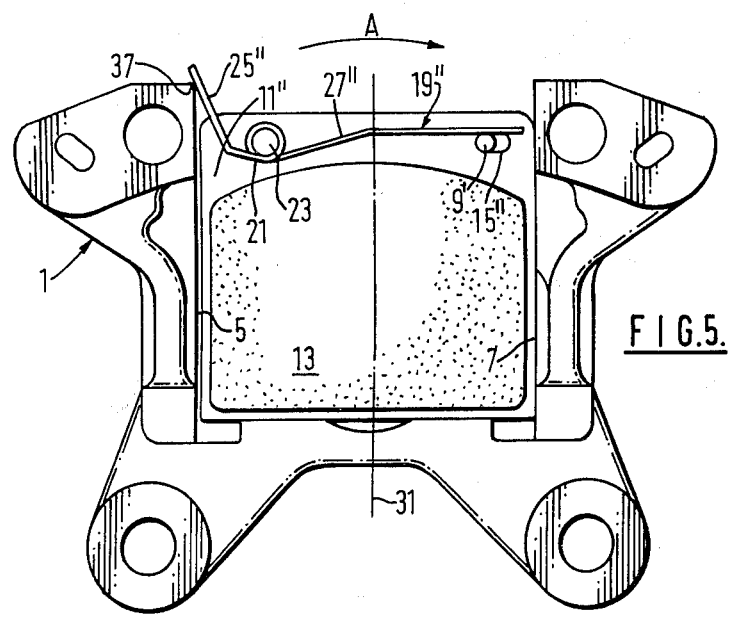
FIG. 5 shows a cutaway section of a disc brake incorporating still another embodiment of a friction pad assembly constructed according to the present invention.

In the embodiment of FIG. 5, the main difference lies in the arrangement of the spring support 23 and the elongated aperture 15″. In FIG. 5 spring support 23 and elongated aperture 15″ are on opposite sides of central axis 31 towards opposite side edges of the backing plate, elongated aperture 15″ being the nearer to the forward direction abutment face 7. The shorter spring arm 25″ engages the caliper 1 at 37 and the longer spring arm engages solely the pad support pin 9′. Again spring 19″ tends to lift the pad assembly 11″, as viewed in FIG. 5, and thus biasses the backing plate against pin 9′, thus reducing rattle. Further, due to the circumferential component of the spring force in direction 'A' due to the different effective lengths of spring arm i.e. the shorter arm length is from 37 to coil 21 and the longer arm is from coil 21 to pin 9′, the friction pad assembly is biassed against forward abutment face 7.

Whilst the embodiments of FIGS. 4 and 5 utilise cylindrical pad support pins 9, 9′, triangular cross section pins can be substituted (see FIGS. 2 and 3) and suitably shaped backing plate holes e.g. D-shaped, provided. Alternatively, pins of any other desired polygonal cross-section can be utilised.

In a still further embodiment of the present invention, the spring has one arm, one end of which is secured to the backing plate of the friction pad assembly, the other end region engaging, in use, against a pad support pin passing through a hole in the backing plate, and/or against part of the brake e.g. caliper, to produce the assymmetric loading effect on the pad assembly.

The present invention thus provides a friction pad assembly and a disc brake incorporating such an assembly, wherein 'klonking' is prevented in one direction of braking e.g. the forward direction, and at least alleviated in opposite direction of braking, the spring providing the necessary biassing of the friction pad assembly also doubling in duty as a pad anti-rattle spring.

I claim:

1. A friction pad assembly for a disc brake, comprising a backing plate and a pad of friction material secured thereto, the backing plate having at least one hole offset from the central axis of the assembly, through which a pad support pin can pass to engage a wire spring attached to and positively supported on the backing plate at one position only which position is nearer to one side edge of the backing plate than the other, said wire spring having two arms oppositely directed from the spring's position of attachment to produce an assymetric loading effect on the pad assembly when installed in a disc brake such that one arm of said spring engages said pin.

2. A friction pad assembly according to claim 1, wherein the backing plate is planar, two holes being provided in a region of the backing plate which is free of friction material, the holes being symmetrically arranged on the pad assembly.

3. A friction pad assembly according to claim 2, wherein the wire spring is attached to the backing plate by a support on the backing plate, the support being located on the opposite side of a line connecting the said holes, from the friction material.

4. A friction pad assembly according to claim 2, wherein the wire spring has a coiled region which is attached to the backing plate by means of a support in the form of a rivet.

5. A friction pad assembly according to any one of the preceding claims, wherein one arm of the spring shorter than the other.

6. A friction pad assembly according to claim 2, wherein the holes in the backing plate are D-shaped and so oriented that, in use, the guide pins traverse the straight side of the holes.

7. A friction pad assembly according to claim 1 wherein the backing plate is planar and only one hole off-set from the central axis of the assembly is provided in a region of the backing plate which is free of friction material.

8. A friction pad assembly according to claim 7, wherein the wire spring has a coiled region which is attached to the backing plate by a support carried on the backing plate at said one position.

9. A friction pad assembly according to claim 8, wherein said support is a rivet.

10. A friction pad assembly according to any one of claims 7, 8 and 9, wherein one arm being shorter than the other.

11. A friction pad assembly for a disc brake, comprising a backing plate and a pad of friction material secured thereto, the backing plate having two holes spaced apart from each other, through which pad support pins can pass to engage a wire spring attached to and positively supported on the backing plate at one position only which position is nearer to one side edge of the backing plate than the other, said wire spring having two arms oppositely directed from the spring's position of attachment to produce an asymmetric loading effect on the pad assembly when installed in a brake such that each arm of said spring engages a respective one of said pins.

12. A disc brake comprising a caliper and a torque member, a friction pad assembly being supported on spaced apart pins carried by the caliper or torque member, the friction pad assembly comprising a backing plate with a pad of friction material secured thereto, the backing plate having two holes spaced apart from each other, through which the pad support pins pass to engage a wire spring attached to and positively supported on the backing plate at one position only, which position is nearer to one side edge than the other, said spring having two arms oppositely directed from the spring's position of attachment engaging the respective pins to produce an asymmetric loading effect on the pad assembly, and bias it against the pins and circumferentially against an abutment face provided on the caliper or torque member.

13. A disc brake comprising a caliper and a torque member, a friction pad assembly being supported on at least one pin carried by the caliper or torque member, the friction pad assembly comprising a backing plate with a pad of friction material secured thereto, the backing plate having at least one hole offset from the central axis of the assembly, through which the pad support pin passes to engage a wire spring attached to and positively supported on the backing plate at one position only on said backing plate which position is nearer to one side edge of the backing pad than the other, said wire spring having two arms oppositely directed from the spring's position of attachment one arm of said spring engaging said pin and/or said caliper or torque plate to produce an asymmetric loading effect on the pad assembly, to thus bias the friction pad assembly against the pin and circumferentially against an abutment face provided on the caliper or torque member.

14. A disc brake according to claim 12 or 13, wherein the pad support pin or pins are triangular in cross-section.

* * * * *